US012122010B2

United States Patent
Ogino et al.

(10) Patent No.: US 12,122,010 B2
(45) Date of Patent: Oct. 22, 2024

(54) TOOL MANAGEMENT DEVICE AND TOOL MANAGEMENT METHOD FOR DETERMINING AN ACCUMULATED WEAR AMOUNT OF A TOOL

(71) Applicant: AMADA CO., LTD., Kanagawa (JP)

(72) Inventors: Masashi Ogino, Kanagawa (JP); Tetsuya Sano, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 753 days.

(21) Appl. No.: 17/417,690

(22) PCT Filed: Dec. 20, 2019

(86) PCT No.: PCT/JP2019/049981
§ 371 (c)(1),
(2) Date: Jun. 23, 2021

(87) PCT Pub. No.: WO2020/137841
PCT Pub. Date: Jul. 2, 2020

(65) Prior Publication Data
US 2022/0111480 A1 Apr. 14, 2022

(30) Foreign Application Priority Data
Dec. 27, 2018 (JP) .................. 2018-244380

(51) Int. Cl.
*B23Q 17/24* (2006.01)
*B21D 37/10* (2006.01)
(Continued)

(52) U.S. Cl.
CPC ......... *B23Q 17/2457* (2013.01); *B21D 37/10* (2013.01); *B24B 3/60* (2013.01);
(Continued)

(58) Field of Classification Search
USPC .......................................... 702/34
See application file for complete search history.

(56) References Cited

U.S. PATENT DOCUMENTS 5,478,301 A 12/1995 Takahashi
5,595,560 A * 1/1997 Kamada ............... B21D 37/145
83/559

(Continued)

FOREIGN PATENT DOCUMENTS

JP 61-74738 A 4/1986
JP S61-74739 A 4/1986

(Continued)

OTHER PUBLICATIONS

Extended European Search Report for corresponding EP Application No. 19902801.0 dated Jan. 25, 2022.

(Continued)

*Primary Examiner* — Paul D Lee
(74) *Attorney, Agent, or Firm* — Renner, Otto, Boisselle & Sklar, LLP

(57) ABSTRACT

An accumulated wear amount calculation section calculates a wear amount of a blade edge of a punch and a wear amount of a blade edge of a die when a tool set of the punch and the die has processed a sheet metal once. The accumulated wear amount calculation section calculates an accumulated wear amount of the blade edge of the punch and an accumulated wear amount of the blade edge of the die by accumulating wear amounts of respective times when the tool set has processed the sheet metal multiple times. A tool management information managing section manages a state of the blade edge of each punch and each die by causing a tool management information storage section to store tool management information associating a tool identification code given to each punch and each die with the accumulated wear (Continued)

amounts calculated by the accumulated wear amount calculation section.

12 Claims, 7 Drawing Sheets

(51) Int. Cl.
    *B24B 3/60*         (2006.01)
    *G01B 5/00*         (2006.01)
    *B21D 28/24*       (2006.01)
    *G05B 19/4065*    (2006.01)

(52) U.S. Cl.
    CPC ............... *G01B 5/00* (2013.01); *B21D 28/24* (2013.01); *G05B 19/4065* (2013.01)

(56) References Cited

U.S. PATENT DOCUMENTS

| | | | |
|---|---|---|---|
| 6,584,415 B1 | 6/2003 | Uneme et al. | |
| 2002/0013639 A1* | 1/2002 | Fujishima | G05B 19/4065 700/169 |
| 2009/0100896 A1* | 4/2009 | Akami | B21D 37/145 72/15.1 |
| 2015/0142154 A1* | 5/2015 | Tiano | G05B 19/4065 700/109 |

FOREIGN PATENT DOCUMENTS

| | | |
|---|---|---|
| JP | 5-76959 A | 3/1993 |
| JP | 5-26572 B2 | 4/1993 |
| JP | 9-155474 A | 6/1997 |
| JP | 3893164 B2 | 3/2007 |
| JP | 2007265361 A | 10/2007 |
| JP | 2010-279990 A | 12/2010 |
| JP | 4901022 B2 | 3/2012 |
| JP | 2017205826 A | 11/2017 |
| JP | 6328957 B2 | 5/2018 |
| WO | 2000012260 A1 | 3/2000 |

OTHER PUBLICATIONS

Syed Abdul Vali: "A New Analytcal Model for Tool Life in Metal Stamping", May 30, 2006 (May 30, 2006), XP055879236, Retrieved from the Internet: URL:https://macsphere.mcmaster.ca/bitstream/11375/22280/1/Syed_Abdul%20Vali_2006May_Master.. pdf [retrieved on Jan. 14, 2022]; Sections 1 and 3.1; Sections 2 and 7.

International Search Report for corresponding Application No. PCT/JP2019/049981, mailed Feb. 4, 2020.

Written Opinion for corresponding Application No. PCT/JP2019/049981, mailed Feb. 4, 2020.

* cited by examiner

Fig. 2

| | STATE | TYPE | SHAPE | RANGE | X DIMENSION | Y DIMENSION | R DIMENSION | ACCUMULATED HIT COUNT | ACCUMULATED WEAR AMOUNT | |
|---|---|---|---|---|---|---|---|---|---|---|
| P01 | | PUNCH | ROUND | A | 8.000 | 0.000 | 0.000 | 2290 | 0.004 | ⋮ |
| P02 | ● | PUNCH | RECTANGLE | B | 30.000 | 5.000 | 0.000 | 1180 | 0.002 | ⋮ |
| D01 | | DIE | RECTANGLE | D | 80.200 | 6.200 | 0.000 | 12392 | 0.022 | ⋮ |
| D02 | ◯ | DIE | ROUND | A | 8.200 | 0.000 | 0.000 | 3405 | 0.007 | ⋮ |
| P03 | | PUNCH | RECTANGLE | D | 80.000 | 6.000 | 0.000 | 13980 | 0.023 | ⋮ |
| D03 | | DIE | SPECIAL SHAPE | B | 0.000 | 0.000 | 0.000 | 7214 | 0.015 | ⋮ |
| P04 | | PUNCH | SHAPING | A | 0.000 | 0.000 | 0.000 | 1310 | 0.001 | ⋮ |
| D04 | | DIE | SQUARE | C | 30.300 | 30.300 | 0.000 | 1465 | 0.001 | ⋮ |
| P05 | ◐ | PUNCH | ROUND | A | 8.250 | 0.000 | 0.000 | 9075 | 0.018 | ⋮ |
| P06 | ◎ | PUNCH | RECTANGLE | E | 110.000 | 10.000 | 0.000 | 10154 | 0.021 | ⋮ |
| P07 | ◎ | PUNCH | OBROUND | B | 30.000 | 8.000 | 0.000 | 8571 | 0.051 | ⋮ |
| D05 | | DIE | ROUND | A | 8.400 | 0.000 | 0.000 | 4870 | 0.009 | ⋮ |

Fig. 6

| CLEARANCE VALUE | MATERIAL OF SHEET METAL | | |
|---|---|---|---|
| | STAINLESS STEEL PLATE | MILD STEEL PLATE | ALUMINUM PLATE |
| LARGER THAN RECOMMENDED CLEARANCE | k11 | k21 | k31 |
| WITHIN RANGE OF RECOMMENDED CLEARANCE | k12 | k22 | k32 |
| SMALLER THAN RECOMMENDED CLEARANCE | k13 | k23 | k33 |

TOOL MANAGEMENT DEVICE AND TOOL MANAGEMENT METHOD FOR DETERMINING AN ACCUMULATED WEAR AMOUNT OF A TOOL

TECHNICAL FIELD

The present disclosure relates to a tool management device and a tool management method.

BACKGROUND ART

A punching machine processes a sheet metal by punching or shaping the sheet metal using a tool set of a punch and a die. A blade edge of the tool becomes worn every time the sheet metal is processed. When the sheet metal is processed with a tool having an excessively worn blade edge, burrs are generated on a processed surface of a product to be manufactured by the sheet metal processing. This results in a deteriorated product quality. Therefore, when the blade edge is worn at a level equal to or higher than the criteria, an operator needs to polish the blade edge with a tool grinder.

Conventionally, whether or not the tool (blade edge) needs to be polished is determined by the operator who visually checks the blade edge or checks the state of burrs generated on the processed surface of the product. It is a complicated task for the operator to determine whether or not the tool needs to be polished. In Patent Literature 1 or 2, it is proposed that a control device determines whether the tool is in a state of requiring polishing in consideration of a hit count by which the tool has processed the sheet metal, a material (or hardness) and a thickness of the sheet metal, and then informs the operator.

CITATION LIST

Patent Literature

Patent Literature 1: Japanese Patent Laid-Open No. 61-74739
Patent Literature 2: Japanese Patent No. 3893164

SUMMARY

In order to improve the quality of a product, it is required to determine the state of the blade edge of the tool with high accuracy. An object of one or more embodiments is to provide a tool management device and a tool management method capable of determining the state of the blade edge of the tool with high accuracy.

According to a first aspect of one or more embodiments, there is provided a tool management device including an accumulated wear amount calculation section configured to calculate a wear amount of a blade edge of a punch and a wear amount of a blade edge of a die when a tool set of the punch and the die has processed a sheet metal once, by an arithmetic equation using a real number of a clearance value between dimensions of the blade edge of the punch and dimensions of the blade edge of the die, or a coefficient corresponding to the clearance value when a punching machine has processed the sheet metal with the tool set, and to calculate an accumulated wear amount of the blade edge of the punch and an accumulated wear amount of the blade edge of the die by accumulating wear amounts of respective times when the tool set has processed the sheet metal multiple times, and a tool management information managing section configured to manage a state of the blade edge of each punch and each die by causing a tool management information storage section to store tool management information associating a tool identification code given to each punch and each die with the accumulated wear amounts calculated by the accumulated wear amount calculation section.

According to a second aspect of the one or more embodiments, there is provided a tool management method executed by a computer device, the method including calculating a wear amount of a blade edge of a punch and a wear amount of a blade edge of a die when a tool set of the punch and the die has processed a sheet metal once, by an arithmetic equation using a real number of a clearance value between dimensions of the blade edge of the punch and dimensions of the blade edge of the die, or a coefficient corresponding to the clearance value when a punching machine has processed the sheet metal with the tool set, calculating an accumulated wear amount of the blade edge of the punch and an accumulated wear amount of the blade edge of the die by accumulating wear amounts of respective times when the tool set has processed the sheet metal multiple times, and managing a state of the blade edge of each punch and each die by causing a tool management information storage section to store tool management information associating a tool identification code given to each punch and each die with the accumulated wear amounts.

According to the tool management device and the tool management method of the one or more embodiments, the state of the blade edge of the tool can be determined with high accuracy.

BRIEF DESCRIPTION OF DRAWINGS

FIG. 2 is a diagram showing an example of a tool list displayed on a display section by the tool management device according to the one or more embodiments.

FIG. 6 is a table showing coefficients corresponding to clearance values used by the tool management device according to the one or more embodiments when calculating the accumulated wear amount.

DESCRIPTION OF EMBODIMENT

Hereinafter, a tool management device and a tool management method according to one or more embodiments will be described with reference to the accompanying drawings.

Figure 1:
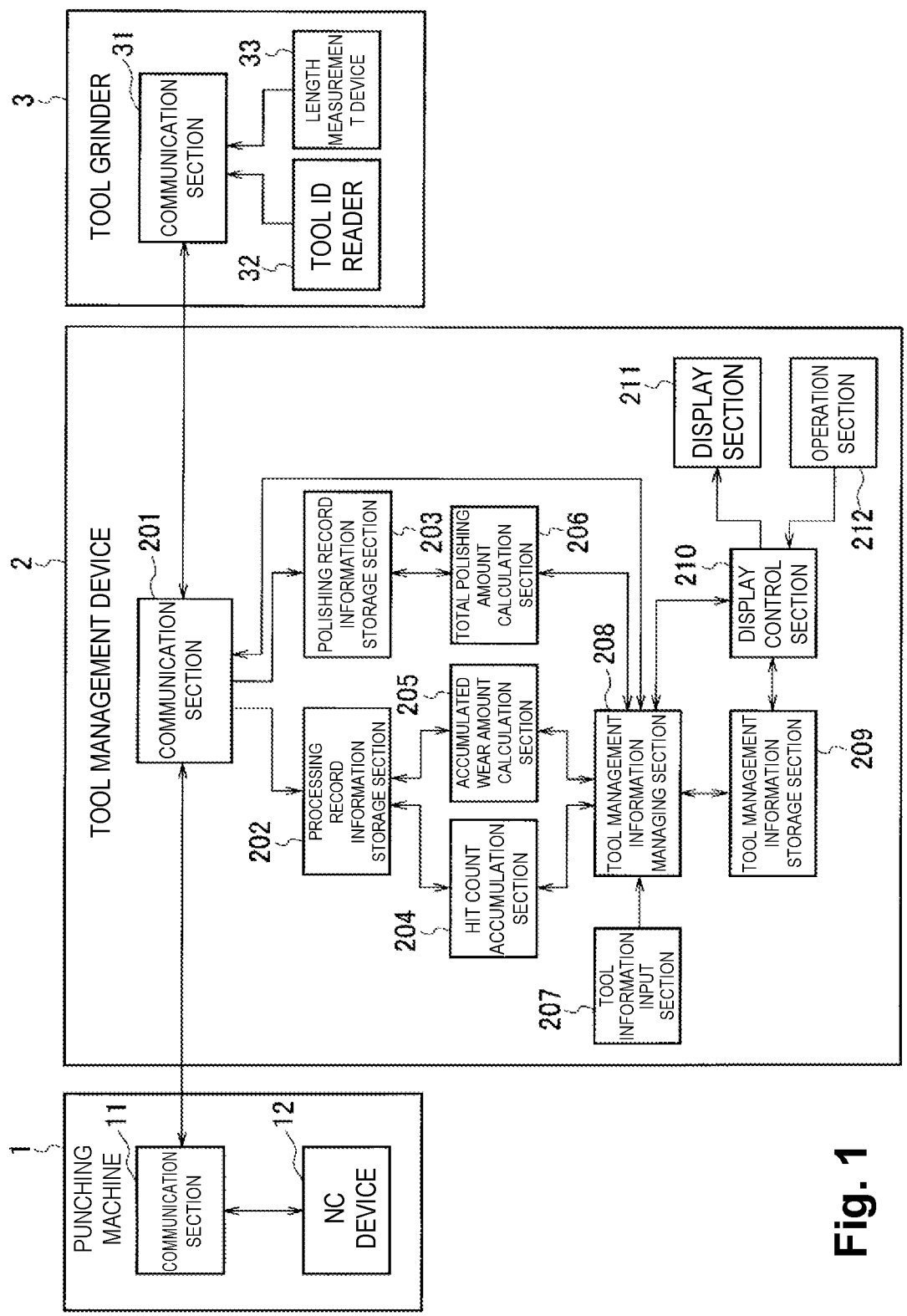
FIG. 1 is a diagram showing a tool management device according to one or more embodiments.

In FIG. 1, a punching machine 1 is connected to a tool management device 2 via a network, and the tool management device 2 is connected to a tool grinder 3 via a network. The punching machine 1, the tool management device 2, and the tool grinder 3 are respectively provided with communication sections 11, 201, and 31 for communicating via the network. The punching machine 1 is, for example, a turret punch press. The tool grinder may be referred to as a tool polisher.

In addition to the communication section 11, the punching machine 1 is provided with an NC device 12 that controls processing of a sheet metal by the punching machine 1. The punching machine 1 mounts a tool managed by the tool management device 2 to process the sheet metal.

The tool management device 2 can be made up of a server using a computer device connectable to the network. In addition to the communication section 201, the tool management device 2 is provided with a processing record information storage section 202, a polishing record information storage section 203, a hit count accumulation section 204, an accumulated wear amount calculation section 205, and a total polishing amount calculation section 206. Further, the tool management device 2 is provided with a tool information input section 207, a tool management information managing section 208, a tool management information storage section 209, a display control section 210, a display section 211, and an operation section 212.

At least, the hit count accumulation section 204, the accumulated wear amount calculation section 205, the total polishing amount calculation section 206, the tool management information managing section 208, and the display control section 210 can be made up of a central processing unit (CPU) included in the computer device. The processing record information storage section 202, the polishing record information storage section 203, and the tool management information storage section 209 can be made up of a storage medium included in the computer device. The processing record information storage section 202, the polishing record information storage section 203, and the tool management information storage section 209 may be separate storage media, or may be separate storage areas in one storage medium.

Tool information on a tool managed by the tool management device 2 is input by the tool information input section 207 and supplied to the tool management information managing section 208. The tool information includes a tool identification code (hereinafter, tool ID) for uniquely identifying the tool, a type indicating whether the tool is a punch or a die, a shape of the tool, information on a size of the tool, and a maximum polishing amount up to which polishing can be performed. The tool ID is expressed by a plurality of digits of numbers or alphabets. The information on the size of the tool includes a range indicating a type of the size of the tool, dimensions of the blade edge of the tool, and a length (height) of the tool. The length of the tool is an original length of the tool at the time of shipment.

By way of example, the tool information input section 207 is a reading section that reads a text file including the tool information. The tool information input section 207 may be a reader that reads tool information represented by a two-dimensional code. The tool information may be manually input with the operation section 212 and supplied to the tool management information managing section 208.

When the tool information is input by the tool information input section 207 or the operation section 212, the tool management information managing section 208 writes the tool information for managing each tool into the tool management information storage section 209. The tool management information storage section 209 stores tool information on all the tools managed by the tool management device 2.

The tool ID is given to each tool in the form of a two-dimensional code, for example. The two-dimensional code is preferably stamped on each tool. When the tool is mounted on the punching machine 1, the tool ID is read by a reader (not shown), and the NC device 12 manages each tool by the tool ID. The tool ID that has been read is transmitted to the tool management device 2 via the communication section 11. When the communication section 201 receives the tool ID transmitted from the punching machine 1, the tool management device 2 reads the tool information corresponding to the received tool ID from the tool management information storage section 209 and supplies the tool information to the punching machine 1. The punching machine 1 processes the sheet metal by using the mounted tool based on a processing program.

The communication section 11 is connected to the NC device 12. When the punching machine 1 processes the sheet metal, the communication section 11 transmits, to the tool management device 2, processing record information indicating a processing record supplied from the NC device 12. The communication section 11 transmits, as processing record information, at least each tool ID of the punch and the die, the hit count of the sheet metal processing, the material and the thickness of the sheet metal, to the tool management device 2. When, for example, three sets of the punch and the die have been used to process the sheet metal, the processing record information on all three sets is transmitted to the tool management device 2.

When the communication section 201 receives the processing record information from the punching machine 1, the processing record information storage section 202 stores the processing record information. The processing record information storage section 202 stores, as a log, the processing record information added with reception date/time information each time the processing record information is supplied from the punching machine 1.

If the processing record information storage section 202 stores the processing record information on the tool ID having the accumulated hit count not stored in the tool management information storage section 209, the hit count accumulation section 204 supplies, to the tool management information managing section 208, the hit count included in the processing record information. The tool management information managing section 208 writes the inputted hit count as the accumulated hit count in association with the tool ID.

If the processing record information storage section 202 stores the processing record information on the tool ID having the accumulated hit count already stored in the tool management information storage section 209, the hit count accumulation section 204 updates the accumulated hit count by adding a hit count included in the processing record information to the accumulated hit count read from the tool management information storage section 209. The tool management information managing section 208 overwrites the updated accumulated hit count in the tool management information storage section 209. The accumulated hit count stored in the tool management information storage section 209 is updated every time new processing record information on the same tool ID is stored in the processing record information storage section 202 unless it is cleared as described below.

If the processing record information storage section 202 stores the processing record information, the accumulated wear amount calculation section 205 calculates an accumulated wear amount of the blade edge for each tool ID. Specifically, the accumulated wear amount calculation section 205 calculates a wear amount of the tool in one processing. If the tool having the same tool ID is used multiple times, the accumulated wear amount calculation section 205 calculates the accumulated wear amount by accumulating the wear amount of each time in the multiple processing. The accumulated wear amount calculation section 205 supplies the accumulated wear amount to the tool management information managing section 208. The tool management information managing section 208 writes the inputted accumulated wear amount in association with the tool ID.

If the processing record information storage section 202 stores the processing record information on the tool ID having the accumulated wear amount already stored in the tool management information storage section 209, the accumulated wear amount calculation section 205 updates the accumulated wear amount by adding a newly calculated accumulated wear amount to the accumulated wear amount read from the tool management information storage section 209. The tool management information managing section 208 overwrites the updated accumulated wear amount in the tool management information storage section 209. The accumulated wear amount stored in the tool management information storage section 209 is updated each time new processing record information on the same tool ID is stored in the processing record information storage section 202 unless it is cleared as described below.

The accumulated wear amount calculation section 205 calculates a wear amount of the tool in one processing in consideration of the material (that is, hardness) and the thickness of the sheet metal. Specifically, the accumulated wear amount calculation section 205 may calculate the wear amount by an arithmetic equation using a coefficient set according to the material of the sheet metal and a coefficient set according to the thickness of the sheet metal.

In addition, it is preferable that the accumulated wear amount calculation section 205 calculates the wear amount of the tool in one processing in consideration of a clearance value between the blade edges in the set of the punch and the die that have been used for processing the sheet metal. Specifically, the accumulated wear amount calculation section 205 may calculate the wear amount by an arithmetic equation using a coefficient (a clearance coefficient) set according to the clearance value. The accumulated wear amount calculation section 205 may calculate the wear amount by an arithmetic equation using a real number of the clearance value.

The calculation of the wear amount according to the clearance value will be described in detail. For a set of a punch and a die, a recommended clearance value expressed by the percentage of a thickness is determined for each material of the sheet metal. For example, for a sheet metal of a certain material, 20% to 25% of the thickness is determined as the recommended clearance value. The wear amount of the tool when the sheet metal is processed with a set of a punch and a die having a recommended clearance is compared with the wear amount of the tool when the sheet metal is processed with a set of a punch and a die having a clearance value smaller than the recommended clearance value, and the result shows that the wear amount of the latter is larger than that of the former.

The wear amount of the tool when the sheet metal is processed with a set of a punch and a die having a recommended clearance value is compared with the wear amount of the tool when the sheet metal is processed with a set of a punch and a die having a clearance value larger than the recommended clearance value, and the result shows that the wear amount of the latter is smaller than that of the former.

The accumulated wear amount calculation section 205 uses a coefficient for calculating a standard wear amount when the clearance value of the set of the punch and the die is the recommended clearance value. When the clearance value is smaller than the recommended clearance value, the accumulated wear amount calculation section 205 uses a coefficient for calculating a wear amount larger than the standard value. When the clearance value is larger than the recommended clearance value, the accumulated wear amount calculation section 205 uses a coefficient for calculating a wear amount smaller than the standard value. The accumulated wear amount calculation section 205 calculates the accumulated wear amount by accumulating the standard wear amount, the wear amount larger than the standard, or the wear amount smaller than the standard calculated in each processing.

When an instruction is given by the operation section 212 to display, on the display section 211, the tool management information such as a tool list described later, the display control section 210 reads the tool management information stored in the tool management information storage section 209 and then controls the display section 211 to displays the tool management information. The display control section 210 may add an icon indicating a state of each tool to the tool list displayed on the display section 211 based on the control by the tool management information managing section 208.

FIG. 2 shows an example of a tool list 20 displayed on the display section 211 according to a display instruction by the operation section 212. In the example shown in FIG. 2, the tool list 20 includes a type indicating whether each tool is a punch or a die, a shape of the tool, a range of the tool, dimensions of a blade edge of the tool (an X dimension and a Y dimension). The shape of the tool is round, square, obround, rectangle, shaping, special, or the like. The ranges of the tool are classified by alphabetical letters from A to E. The punches and the dies shown in the tool list 20 of FIG. 2 are referred to as P01 to P07, and D01 to D05, respectively. An arbitrary punch is referred to as P, and an arbitrary die is referred to as D. Note that in the case of a square or rectangle tool with R in which each inside corner has an arc shape with a radius of curvature R, the dimensions of the blade edge are expressed by an R dimension in addition to the X and Y dimensions.

Figure 3A:
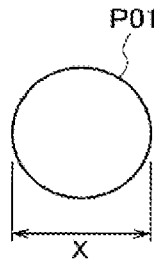
FIG. 3A is a plan view conceptually showing a blade edge of a tool in a round shape.
Figure 3B:
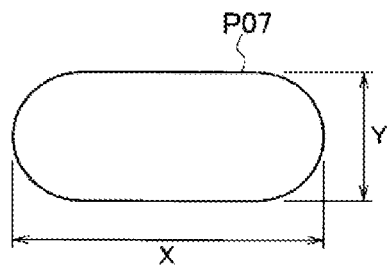
FIG. 3B is a plan view conceptually showing a blade edge of a tool in an obround shape.
Figure 3C:
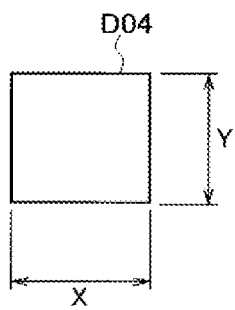
FIG. 3C is a plan view conceptually showing a blade edge of a tool in a square shape.
Figure 3D:
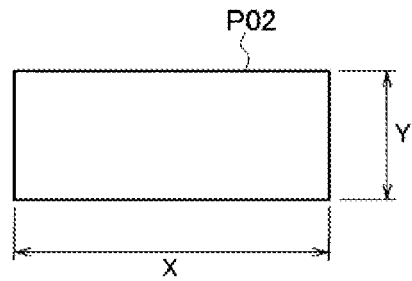
FIG. 3D is a plan view conceptually showing a blade edge of a tool in a rectangle shape.

As shown in FIG. 3A, the dimensions of the blade edge of the punch P having a round shape such as the punch P01 can be specified only by the X dimension. The same applies to the blade edge of the die D having a round shape such as the die D02. As shown in FIG. 3B, the dimensions of the blade edge of the punch P having an obround shape such as the punch P07 can be specified by the X dimension and the Y dimension. The same applies to the blade edge of the die D having an obround shape. As shown in FIG. 3C, the dimensions of the blade edge of the die D having a square shape such as the die D04 can be specified by the X dimension and the Y dimension. The same applies to the blade edge of the punch P having a square shape. As shown in FIG. 3D, the dimensions of the blade edge of the punch P having a rectangle shape such as the punch P02 can be specified by the X dimension and the Y dimension. The same applies to the blade edge of the die D having a rectangle shape.

Figure 4:
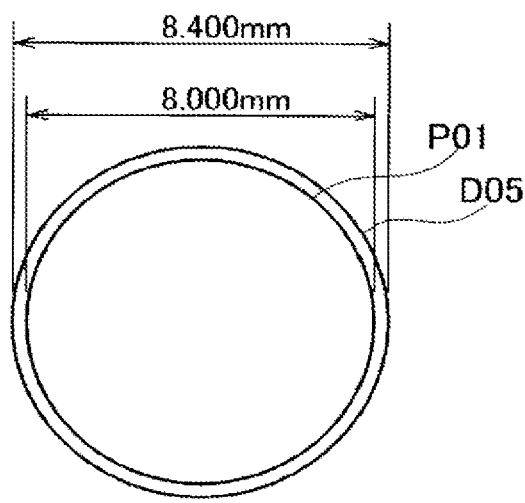
FIG. 4 is a plan view showing a clearance between a punch and a die.

For example, when the punch P01 and the die D05 are used as a set as shown in FIG. 4, since the X dimensions of the punch P01 and the die D05 are 8.000 mm and 8.400 mm, respectively, the clearance value between the punch P and the die D is 0.400 mm. The clearance value when the punch P01 and the die D02 are used as a set is 0.200 mm, and the clearance value when the punch P05 and the die D05 are used as a set is 0.150 mm.

The tool list 20 shown in FIG. 2 includes the accumulated hit count and the accumulated wear amount obtained in a manner as described above. The tool list 20 is a display example of the tool management information, and in the display example shown in FIG. 2, the tool management information includes the tool information, the accumulated hit count, and the accumulated wear amount. Further, in the tool list 20, one of icons i21 to i24 may be displayed so that a state of each punch P or each die D determined by the tool management information managing section 208 can be graphically recognized with ease.

The icon i22 (first icon) indicates that the accumulated hit count or the accumulated wear amount exceeds a reference value at which polishing is recommended, and has reached a state of requiring polishing (hereinafter, a maintenance required state). The icon i21 (second icon) indicates that the accumulated hit count or the accumulated wear amount is approaching the maintenance required state but has not reached the maintenance required state yet (hereinafter, a maintenance preparation state).

The tool management information managing section 208 may provide a control such that the icon i21 is displayed in a state column when the accumulated hit count or the accumulated wear amount reaches an appropriate percentage such as 80%, for example, of a reference value and is determined to have reached the maintenance preparation state. The tool management information managing section 208 may provide a control such that the icon i22 is displayed in the state column when the accumulated hit count or the accumulated wear amount exceeds the reference value. The display control section 210 displays the icons i21 and i22 in yellow, for example.

The icon i24 (third icon) indicates that the tool has reached a state of requiring tool replacement (hereinafter, a replacement required state). The replacement required state is a state in which a total polishing amount of the tool added with the accumulated wear amount exceeds the maximum total polishing amount up to which polishing of the tool can be performed, and the blade edge is substantially lost in length equal to or more than the maximum total polishing amount. The icon i23 (fourth icon) indicates a state in which the replacement required state has not been reached yet, but the replacement required state is approaching (hereinafter, a replacement preparation state).

The tool management information managing section 208 may control the display control section 210 such that the icon i23 is displayed in the state column when the tool is in the replacement preparation state, and the icon i24 is displayed in the state column when the tool is in the replacement required state. The display control section 210 displays the icons i23 and i24 in red, for example. The method in which the tool management information managing section 208 manages the total polishing amount of the tool will be described below.

The fact that none of the icons i21 to i24 is displayed in the state column of the tool list 20 indicates that the tool is not in any state of the maintenance preparation state, the maintenance required state, the replacement preparation state, or the replacement required state, but is in a good state in which the tool requires neither replacement nor polishing. By hiding the state column of the tool list 20 or selectively displaying the icons i21 to i24, it is possible to distinguish whether each tool is in a good state, or in any state of the maintenance preparation state, the maintenance required state, the replacement preparation state, or the replacement required state.

The tool management information managing section 208 may determine the maintenance preparation state and the maintenance required state only with the accumulated hit count, or may determine the maintenance preparation state and the maintenance required state only with the accumulated wear amount. However, it is preferable to make the determination only with the accumulated wear amount, rather than making the determination only with the accumulated hit count. When the accumulated wear amount is determined in consideration of the clearance value between the punch P and the die D as described above, the state of the blade edge of the tool can be determined with high accuracy. Therefore, it is preferable to use the accumulated wear amount that takes the clearance value into consideration.

The tool management information managing section 208 may determine the maintenance preparation state and the maintenance required state with both of the accumulated hit count and the accumulated wear amount. In this case, the tool management information managing section 208 may determine that the maintenance preparation state has been reached when at least one of the accumulated hit count and the accumulated wear amount is in the maintenance preparation state. The tool management information managing section 208 may determine that the maintenance required state has been reached when at least one of the accumulated hit count and the accumulated wear amount is in the maintenance required state.

The tool list 20 shown in FIG. 2 includes the accumulated hit count and the accumulated wear amount. However, only the state, the type, the shape, the range, the X dimension, the Y dimension (, and the R dimension) may be displayed as items of the tool list 20, and the accumulated hit count and the accumulated wear amount may be displayed as detailed information on the tool when any tool is selected. Only one of the accumulated hit count and the accumulated wear amount may be displayed as the detailed information on the tool. The original length of the tool, the maximum total polishing amount up to which polishing can be performed, and the current total polishing amount may be added to the tool list 20, or at least one of them may be displayed as the detailed information on the tool.

The tool list 20 shown in FIG. 2 can be scrolled in the lateral direction by a horizontal-direction scroll bar 25, a left-direction scroll button 26L, or a right-direction scroll button 26R. In addition, the tool list 20 shown in FIG. 2 can be scrolled in the vertical direction by a vertical-direction scroll bar 27, an upward-direction scroll button 28U, or a downward-direction scroll button 28D.

The tool management device 2 may be configured to be able to display, on the display section 211, the tool management information on a tool managed by the tool management information managing section 208 in any display form. The display control section 210 may add the icon i21 when displaying, on the display section 211, the tool management information on the punch P or the die D having the accumulated wear amount that is approaching the state of requiring polishing. The display control section 210 may add the icon i22 when displaying, on the display section 211, the tool management information on the punch P or the die D having the accumulated wear amount that has reached the state of requiring polishing.

The display control section 210 may add the icon i23 when displaying, on the display section 211, the tool management information on the punch P or the die D having the total polishing amount that is approaching the maximum total polishing amount. The display control section 210 may add the icon i24 when displaying, on the display section 211, the tool management information on the punch P or the die D in which the blade edge thereof is substantially lost in length equal to or larger than the maximum total polishing amount.

Returning to FIG. 1, the method in which the tool management information managing section 208 manages the total polishing amount of each tool will be described. The operator recognizes, based on the tool list 20, that the punches P03 and P06 have reached the maintenance required state. A case in which the punch P03 is to be polished will be taken as an example.

As shown in FIG. 1, the tool grinder 3 is provided with a tool ID reader 32 and a length measurement device 33 in addition to the communication section 31. The length measurement device 33 may be configured integrally with the tool grinder 3, or may be configured separately from the tool grinder 3 in such a manner as to communicate with the tool grinder 3. The operator reads, with the tool ID reader 32, a tool ID given to the punch P03 that is to be polished.

The tool ID that has been read is transmitted to the tool management device 2 via the communication section 31. When the communication section 201 receives the tool ID transmitted from the tool grinder 3, the tool ID is supplied to the tool management information managing section 208. The tool management information managing section 208 reads the accumulated wear amount (0.023 mm) of the punch P03 from the tool management information storage section 209, and the communication section 201 transmits the accumulated wear amount to the tool grinder 3.

The tool grinder 3 displays, on a display section (not shown), the accumulated wear amount received by the communication section 31. The accumulated wear amount displayed on the display section serves as a target of a polishing amount when the operator polishes the punch P03 with the tool grinder 3. The operator may polish the punch P03 by the same value as that of the accumulated wear amount displayed on the display section, or may polish the punch P03 by a value smaller or larger than that of the accumulated wear amount.

After completing the polishing of the punch P03, the operator measures the length (height) of the punch P03 with the length measurement device 33. After the length measurement device 33 measures the length of the punch P03, the measured length of the punch P03 is associated with the tool ID and transmitted to the tool management device 2. When the communication section 201 receives polishing record information including the tool ID and the length of the punch P03 transmitted from the tool grinder 3, the polishing record information storage section 203 stores the polishing record information. The polishing record information storage section 203 stores, as a log, the polishing record information added with reception date/time information each time the processing record information is supplied from the length measurement device 33.

The total polishing amount calculation section 206 calculates the total polishing amount of the punch P03 by subtracting the length of the punch P03 after polishing from the original length of the punch P03 read from the tool management information storage section 209. Since the polishing record information storage section 203 stores the length of the tool after polishing, not a one-time polishing amount of the tool by the tool grinder 3, the total polishing amount calculation section 206 can calculate the total polishing amount when the tool is polished once or multiple times, each time the polishing record information is stored in the polishing record information storage section 203.

The tool management information managing section 208 writes the total polishing amount in the tool management information storage section 209 in association with the tool of the tool ID (in this case, the punch P03). If the same tool is polished for the second time and thereafter, the total polishing amount stored in the tool management information storage section 209 is updated.

The tool management information managing section 208 clears the accumulated hit count and the accumulated wear amount after receiving the length of the tool transmitted from the tool grinder 3 and then updating the total polishing amount of the tool. In other words, the accumulated hit count and the accumulated wear amount are reset to zero. As described above, the operator does not always polish the tool by the same value as that of the accumulated wear amount supplied from the tool management device 2 to the tool grinder 3, and may intentionally polish the tool in a value less than that of the accumulated wear amount. Even in such a case, the tool management information managing section 208 clears the accumulated wear amount. Since the operator does not need to manually clear the accumulated hit count and the accumulated wear amount, it is possible not only to reduce the workload of the operator to manage the state of the blade edge but to prevent omission to clear the accumulated hit count and the accumulated wear amount.

In addition, the tool management information managing section 208 deletes the icon i22 displayed in the state column of the punch P03 of the tool list 20. Then, the tool management information managing section 208 determines that the accumulated hit count or the accumulated wear amount is not approaching the reference value and does not exceed the reference value. Therefore, even if an operation of displaying the tool list 20 on the display section 211 is performed, the icon i22 or i21 is not to be displayed in the state column of the punch P03.

Here, the case has been described in which the operator polishes the punch P03 that is in the maintenance required state. However, when the punch P07 that is in the maintenance preparation state is polished, the total polishing amount stored in the tool management information storage section 209 is also updated, and the accumulated hit count and the accumulated wear amount are cleared in the same manner. In addition, the icon i21 in the state column of the punch P07 is deleted.

Figure 5:
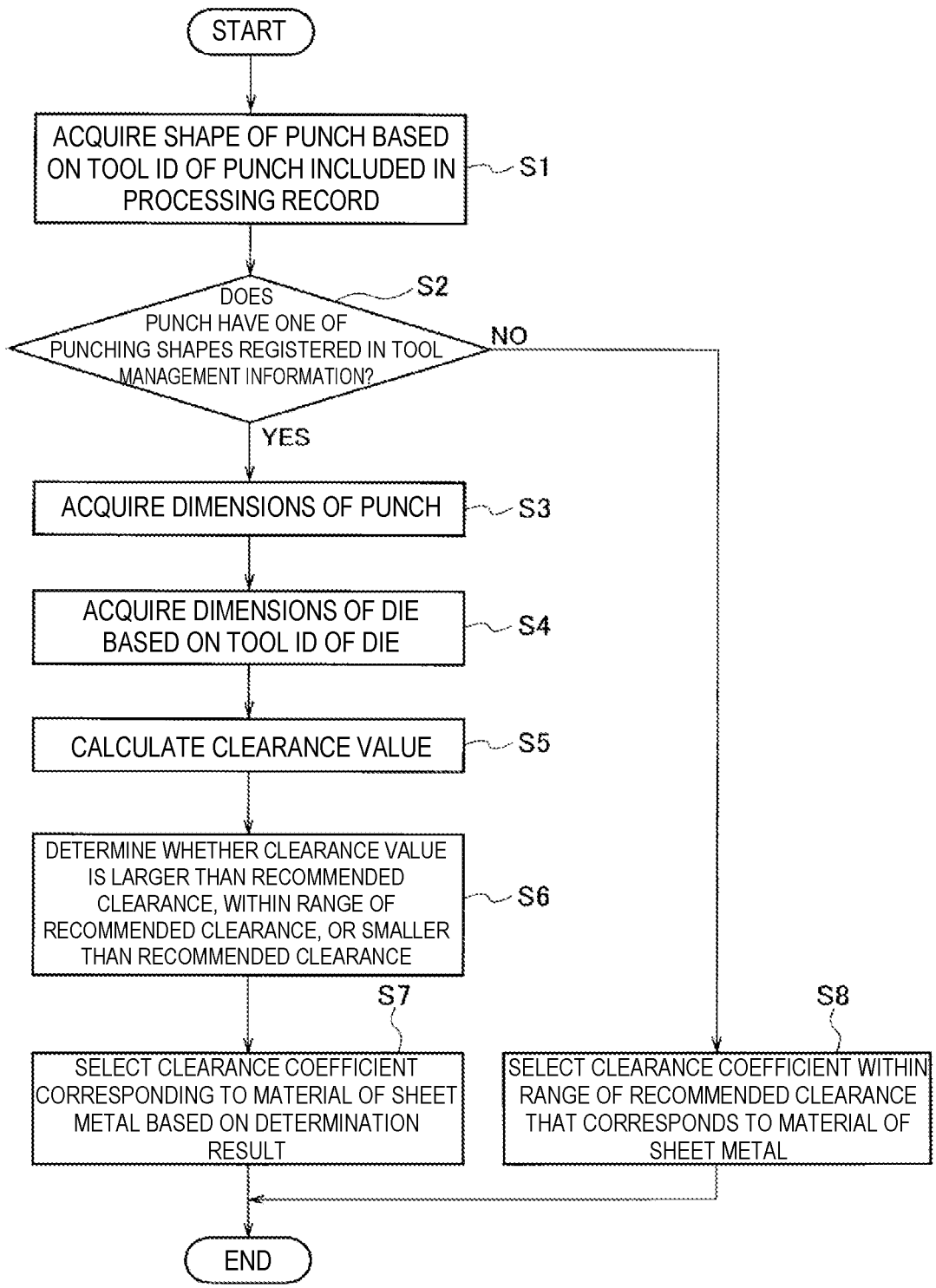
FIG. 5 is a flowchart showing a part of processing when the tool management device and a tool management method according to the one or more embodiments calculate an accumulated wear amount.

With reference to FIGS. 5 and 6, processing will be specifically described in which the accumulated wear amount calculation section 205 selects a clearance coefficient in accordance with the clearance value between the punch and the die. When a process for selecting the clearance coefficient is started, the accumulated wear amount calculation section 205 acquires the shape of the punch P based on the tool ID of the punch P included in the processing record information in step S1.

In step S2, the accumulated wear amount calculation section 205 determines whether or not the acquired shape of the punch P is one of punching shapes that are registered in the tool management information. Punches P01 to P03 and P05 to P07 having a round shape, an obround shape, or a rectangle shape shown in FIG. 2 are punches P each having a punching shape used when a sheet metal is punched.

If the punch P has a punching shape in step S2 (YES), the accumulated wear amount calculation section 205 acquires the dimensions of the punch P in step S3. In step S4, the accumulated wear amount calculation section 205 acquires the dimensions of the die D based on the tool ID of the die D that has been used for a set with the punch P. In step S5, the accumulated wear amount calculation section 205 calculates the clearance value by subtracting the dimensions of the punch P from the dimensions of the die D.

As shown in FIG. 6, in the accumulated wear amount calculation section 205, clearance coefficients are set for the respective materials of the sheet metal, which consist of first to third coefficients different from each other and corresponding to the respective cases of the clearance values being "larger than the recommended clearance", "within the range of the recommended clearance", and "smaller than the recommended clearance."

The clearance coefficients used when the sheet metal is a stainless steel plate are $k11$ to $k13$, and have a relationship of $k11<k12<k13$. The clearance coefficients used when the sheet metal is a mild steel plate are $k21$ to $k23$, and have a relationship of $k21<k22<k23$. The clearance coefficients used when the sheet metal is an aluminum plate are $k31$ to $k33$, and have a relationship of $k31<k32<k33$.

Therefore, the wear amount of the tool in one processing calculated by the accumulated wear amount calculation section 205 corresponds to the magnitude relationship of the clearance coefficients described above, and becomes larger when the clearance value is smaller than the recommended clearance and becomes smaller when the clearance value is larger than the recommended clearance, as compared with the case in which the clearance value is within the range of the recommended clearance. In addition, the wear amount of the tool in one processing is the wear amount corresponding to the material of the sheet metal.

Returning to FIG. 5, in step S6, the accumulated wear amount calculation section 205 determines whether the clearance value is one of the following: "larger than the recommended clearance", "within the range of the recommended clearance", and "smaller than the recommended clearance". In step S7, the accumulated wear amount calculation section 205 selects the clearance coefficient corresponding to the material of the sheet metal based on the determination result, and then ends the processing.

On the other hand, if the punch P does not have a punching shape in step S2 (NO), the accumulated wear amount calculation section 205 selects a clearance coefficient within the range of the recommended clearance that corresponds to the material of the sheet metal in step S8, and then ends the processing. The shaping punch P04 shown in FIG. 2 is the punch P not in the punching shape.

Figure 7:
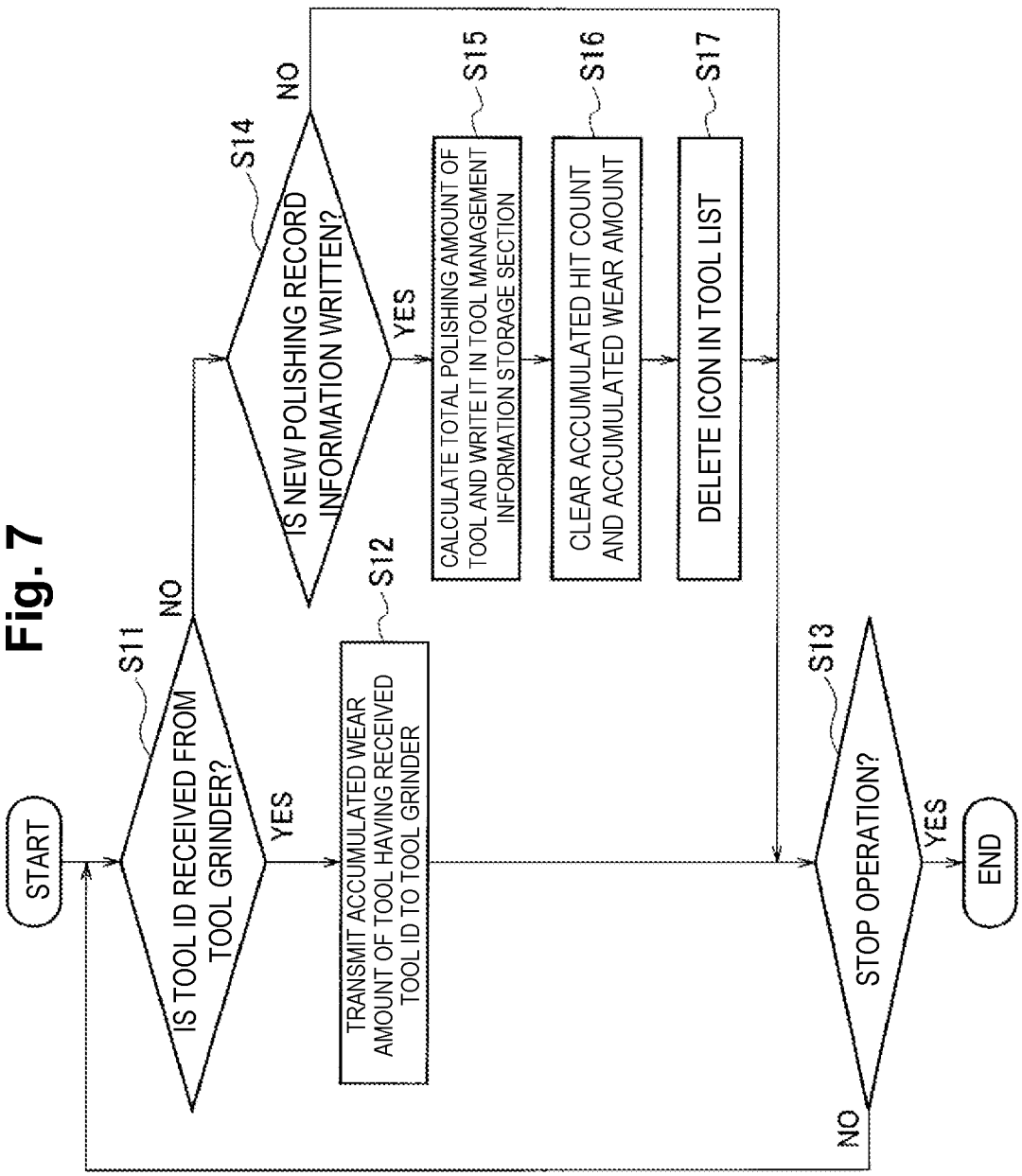
FIG. 7 is a flowchart showing processing in which the tool management device and the tool management method according to the one or more embodiments update the state of tool management based on the polishing record of the tool.

With reference to FIG. 7, processing of managing the tool management information by the tool management information managing section 208 in cooperation with the tool grinder 3 will be described. In FIG. 7, when the tool management device 2 starts to operate, the tool management information managing section 208 determines whether or not a tool ID is received from the tool grinder 3 in step S11. If the tool ID is received (YES), the tool management information managing section 208 performs a control in step S12 such that the accumulated wear amount of the tool having the received tool ID is transmitted to the tool grinder 3 by the communication section 201.

Subsequently, in step S13, the tool management device 2 determines whether or not the tool management device 2 has stopped to operate due to power-off or the like. If the operation is not stopped (NO), the tool management device 2 repeats the processing from step S11 and onwards, and if the operation is stopped (YES), the tool management device 2 ends the processing.

On the other hand, if the tool ID is not received in step S11 (NO), the total polishing amount calculation section 206 determines whether or not new polishing record information is written in the polishing record information storage section 203 in step S14. If the new polishing record information is not written (NO), the tool management device 2 shifts the processing to step S13.

If the new polishing record information is written in step S14 (YES), the total polishing amount calculation section 206 calculates the total polishing amount of the tool, and the tool management information managing section 208 writes the total polishing amount in the tool management information storage section 209 in association with the tool ID in step S15.

Subsequently, the tool management information managing section 208 clears the accumulated hit count and the accumulated wear amount stored in the tool management information storage section 209 in step S16, deletes the icon i22 (or i21) in the tool list 20 in step S17, and shifts the processing to step S13. To be exact, if the process shown in FIG. 7 is executed in a state in which the tool list 20 is not displayed on the display section 211, the tool management information managing section 208 controls the display control section 210 so as to hide the icon i22 (or i21) in step S17.

The present invention is not limited to the one or more embodiments described above, and various modifications can be made without departing from the summary of the present invention. In the one or more embodiments, the tool management device 2 obtains the clearance value between the punch P and the die D based on the tool management information (tool information) stored in the tool management information storage section 209. However, the punching machine 1 may be configured to transmit, to the tool management device 2, the processing record information that includes the clearance value between the punch P and the die D that have been used for processing the sheet metal.

Instead of calculating the total polishing amount of the tool by subtracting the length of the tool after polishing from the length of the tool at the time of shipment, the total polishing amount calculation section 206 may calculate the total polishing amount by receiving a polishing amount of each time of the tool having the same tool ID from the tool grinder 3 and then accumulating the polishing amounts.

In FIG. 7, the accumulated hit count and the accumulated wear amount are cleared when the total polishing amount of the tool is newly written in the tool management information storage section 209 or the total polishing amount that has already been written is updated, but the timing for clearing the accumulated hit count and the accumulated wear amount is not limited. The accumulated hit count and the accumulated wear amount may be cleared at the time when new polishing record information is written in the polishing record information storage section 203. The tool management information managing section 208 may clear the accumulated hit count and the accumulated wear amount after receiving the polishing record information on the managed tool.

In configuring the tool management device 2, either software or hardware is selectively used in an arbitrary manner. The CPU included in the computer device can realize a functional configuration as shown in FIG. 1 by executing a tool management program that is a computer program.

The disclosure of the present application relates to the subject matter described in Japanese Patent Application No. 2018-244380 filed on Dec. 27, 2018, the entire disclosures of which are incorporated herein by reference.

The invention claimed is:

1. A tool management device, comprising:
   an accumulated wear amount calculation section configured to calculate a wear amount of a blade edge of a punch and a wear amount of a blade edge of a die when a tool set of the punch and the die has processed a sheet metal once, by an arithmetic equation using a real number of a clearance value between dimensions of the blade edge of the punch and dimensions of the blade edge of the die, or a coefficient corresponding to the clearance value when a punching machine has processed the sheet metal with the tool set, and to calculate an accumulated wear amount of the blade edge of the punch and an accumulated wear amount of the blade edge of the die by accumulating wear amounts of respective times when the tool set has processed the sheet metal multiple times; and
   a tool management information managing section configured to:
      manage a state of the blade edge of each punch and each die by causing a tool management information storage section to store tool management information associating a tool identification code given to each punch and each die with the accumulated wear amounts calculated by the accumulated wear amount calculation section; and
      transmit the accumulated wear amounts to initiate a polishing of the punch and/or the die.

2. The tool management device according to claim 1, further comprising a display control section configured to control a display section to display tool information on a tool managed by the tool management information managing section, wherein
   when the display control section controls the display section to display tool information on a punch or a die having reached a state of requiring polishing based on the accumulated wear amount calculated by the accumulated wear amount calculation section, the tool management information managing section controls the display control section such that a first icon is displayed on the display section, the first icon indicating that the punch or the die has reached the state of requiring polishing.

3. The tool management device according to claim 2, wherein when the display control section controls the display section to display tool information on a punch or a die not having reached the state of requiring polishing but being approaching the state of requiring polishing based on the accumulated wear amount calculated by the accumulated wear amount calculation section, the tool management information managing section controls the display control section such that a second icon is displayed, the second icon indicating that the punch or the die is approaching the state of requiring polishing.

4. The tool management device according to claim 3, wherein
   the tool management information storage section stores a total polishing amount when a punch or a die has been polished by a tool grinder once or multiple times, and
   when the display control section controls the display section to display tool information on a punch or a die having an amount of the total polishing amount added with the accumulated wear amount exceeding a maximum total polishing amount up to which polishing can be performed, the tool management information managing section controls the display control section such that a third icon is displayed, the third icon indicating that the punch or the die has reached a state of requiring replacement.

5. The tool management device according to claim 4, wherein when the display control section controls the display section to display tool information on a punch or a die not having reached the state of requiring replacement but being approaching the state of requiring replacement, the tool management information managing section controls the display control section such that a fourth icon is displayed, the fourth icon indicating that the punch or the die is approaching the state of requiring replacement.

6. The tool management device according to claim 1, wherein the accumulated wear amount calculation section calculates the wear amounts by using a first coefficient, a second coefficient, or a third coefficient different from each other, when the clearance value of the tool set is larger than a recommended clearance, within a range of the recommended clearance, or smaller than the recommended clearance, respectively.

7. The tool management device according to claim 6, wherein the wear amount calculated by using the first coefficient is smaller than the wear amount calculated by using the second coefficient, and the wear amount calculated by using the third coefficient is larger than the wear amount calculated by using the second coefficient.

8. The tool management device according to claim 7, wherein the accumulated wear amount calculation section uses, as the first to third coefficients, coefficients set in accordance with materials of the sheet metal.

9. A tool management method executed by a computer device, the method comprising:
   calculating a wear amount of a blade edge of a punch and a wear amount of a blade edge of a die when a tool set of the punch and the die has processed a sheet metal once, by an arithmetic equation using a real number of a clearance value between dimensions of the blade edge of the punch and dimensions of the blade edge of the die, or a coefficient corresponding to the clearance value when a punching machine has processed the sheet metal with the tool set;
   calculating an accumulated wear amount of the blade edge of the punch and an accumulated wear amount of the blade edge of the die by accumulating wear amounts of respective times when the tool set has processed the sheet metal multiple times; and
   managing a state of the blade edge of each punch and each die by causing a tool management information storage section to store tool management information associating a tool identification code given to each punch and each die with the accumulated wear amounts, and
   transmitting the accumulated wear amounts to initiate a polishing of the punch and/or the die.

10. The tool management method according to claim 9, further comprising, by the computer device:
    displaying, on a display section, a tool list including tool information on a managed tool; and
    displaying an icon to distinguish a punch or a die having reached a state of requiring polishing based on the accumulated wear amount, from a punch or a die not having reached the state of requiring polishing, of punches and dies displayed in the tool list.

11. The tool management method according to claim 10, further comprising, by the computer device:

managing a total polishing amount of the managed tool by a tool grinder; and displaying an icon to distinguish a punch or a die having an amount of the total polishing amount added with the accumulated wear amount exceeding a maximum total polishing amount up to which polishing can be performed, from a punch or a die having the amount not exceeding the maximum total polishing amount, of punches and dies displayed in the tool list.

12. The tool management method according to claim 9, further comprising, by the computer device, clearing an accumulated wear amount of a polished tool after receiving polishing record information on polishing of the tool by the tool grinder.

* * * * *